(12) United States Patent
Fujita et al.

(10) Patent No.: US 6,198,711 B1
(45) Date of Patent: *Mar. 6, 2001

(54) EQUALIZER FOR OPTICAL REPRODUCING APPARATUS, USING PARTIAL RESPONSE METHOD

(75) Inventors: Goro Fujita; Yoshiyuki Teraoka, both of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/990,878

(22) Filed: Dec. 15, 1997

(30) Foreign Application Priority Data

Dec. 24, 1996 (JP) .................................................. 8-355450

(51) Int. Cl.[7] ........................................................ G11B 7/00
(52) U.S. Cl. .................................. 369/59.16; 369/59.23
(58) Field of Search .......................... 369/44.41, 44.42, 369/44.34, 44.35, 59, 124

(56) References Cited

U.S. PATENT DOCUMENTS

| | | | |
|---|---|---|---|
| 4,831,613 | * 5/1989 | Kanda | 369/48 |
| 5,363,352 | 11/1994 | Tobita et al. | 369/13 |
| 5,469,415 | 11/1995 | Fujita et al. | 369/48 |
| 5,469,420 | 11/1995 | Fujita et al. | 369/59 |
| 5,517,481 | 5/1996 | Kobayashi | 369/124 |
| 5,812,505 | * 9/1998 | Shimoda et al. | 369/44.41 |
| 5,881,039 | * 3/1999 | Sano et al. | 369/48 |
| 5,886,964 | * 3/1999 | Fujita | 369/44.41 |
| 5,892,741 | * 4/1999 | Kadowaki et al. | 369/44.41 |

FOREIGN PATENT DOCUMENTS

0430811 A2  6/1991 (EP) .
0652559 A2  5/1995 (EP) .

OTHER PUBLICATIONS

Patent Abstracts of Japan, JP 8–180608, Published Jul. 12, 1996, Sharp Corp.
M. Ferguson, "Optimal Reception for Binary Partial Response Channels," The Bell System Technical Journal, vol. 51, No. 2, Feb. 1972, pp. 493–505.
K. Arai, "PRML Signal Processing Techniques," White Series No. 154, Published Sep. 27, 1994, Chapter 4, "PR Coding Method," pp. 81–97.

* cited by examiner

Primary Examiner—Nabil Hindi
(74) Attorney, Agent, or Firm—Limbach & Limbach, LLP

(57) ABSTRACT

An equalizer used for an optical reproducing apparatus performs an optimal equalizing operation in accordance with the spatial frequency without needing an electrical equalizer. The optical reproducing apparatus reproduces the reproducing data in the following manner. A detector is provided for receiving reflected light from a disc. The detector is divided into a plurality of light receiving areas by a line perpendicular to the light receiving direction corresponding to the disc track direction. Then, calculations are made on the outputs from the respective light receiving areas to specifically correct the spatial frequency characteristics. The calculated signal is then decoded.

20 Claims, 12 Drawing Sheets

FIG. 12
PRIOR ART

| PR CLASS NO. | SAMPLED-POINT DISPLAY | RESPONSE WAVEFORM | FREQUENCY CHARACTERISTICS | OUTPUT LEVEL NUMBER IN RESPONSE TO BINARY INPUT DATA |
|---|---|---|---|---|
| PR0 | NYQUIST WAVEFORM (1) | | | 2 |
| PR1 | PR (1, 1) | | | 3 |
| PR1 | PR (1, 2, 1) | | | 5 |
| PR3 | PR (2, 1, -1) | | | 5 |
| PR4 | PR (1, 0, -1) | | | 3 |
| PR5 | PR (-1, 2, -1) | | | 5 |

EQUALIZER FOR OPTICAL REPRODUCING APPARATUS, USING PARTIAL RESPONSE METHOD

BACKGROUND OF THE INVENTION

1. Field of the Invention

The present invention relates to an equalizer for an optical reproducing apparatus which reproduces data by suitably performing a decoding operation on signals read from a disc-like recording medium in accordance with a partial-response transmitting method.

2. Description of the Related Art

In the field of a system using recording mediums, such as optical discs and magneto-optical discs, research is being made on increasing the recording capacity and the recording density. To achieve high density recording, it is important to shorten the laser wavelengths and to suitably set the numerical aperture (NA) of an objective lens. Moreover, the partial-response transmitting method in which the intersymbol interferences, which would disadvantageously act on high density recording, are paradoxically utilized, is also known as a digital-data transmitting method for facilitating high density recording.

Several types of partial-response transmitting methods may be classified by allocating data in accordance with the characteristics of the transfer functions. The above transmitting methods which have been put into practical use may be represented by PR0 (class 0 partial response, which is also referred to as "the PR(1) method") through PR5 (class 5 partial response, which is also referred to as "the PR (−1, 2, −1) method"), shown in FIG. 12. FIG. 12 illustrates the elements inherent in each partial response method, i.e., the response waveform, the frequency characteristics, and the output level number in response to the binary input data after PR equalization is performed.

In order to achieve even higher density recording after the laser wavelength and the NA are suitably set, it is necessary to introduce the foregoing partial-response transmitting method and also to perform an equalizing operation (correcting the frequency characteristics) on the transmitting signals by means of filtering in an electrical circuit. However, the above equalizing operation may impair the reliability of detecting the data. Thus, the electrical equalizing operation is not sufficient in order to achieve even higher density recording.

Further, in the above equalizing operation, the spatial frequency characteristics are corrected on a time axis. It is thus necessary to change the frequency characteristics in accordance with the linear velocity obtained during disc reproduction. For example, in a constant angular velocity (CAV)-type disc, or a zone CAV-type disc, the equalizing characteristics should be changed in accordance with the reproducing position in the radial direction of the disc. This inevitably increases the complexity of the configuration of the circuit and the equalizing operation.

SUMMARY OF THE INVENTION

Accordingly, in order to overcome the above drawbacks, it is an object of the present invention to optimally perform an equalizing operation in accordance with the spatial frequency characteristics without needing to perform an electrical equalizing operation in which the frequency characteristics should be changed in response to the reproducing position in the radial direction of a disc.

In order to achieve the above object, according to the present invention, there is provided an optical reproducing apparatus comprising: laser emitting means for emitting laser light to an optical recording medium; movement means for moving the laser light along a track of the optical recording medium; light receiving means having a plurality of light receiving areas which are divided by a line perpendicular to the track direction, each of the light receiving areas receiving laser light reflected by the optical recording medium and outputting an electrical signal at a level in accordance with the quantity of light; calculation means for adding the electrical signals from the plurality of light receiving areas based on a predetermined mathematical expression and outputting the calculated signal as a reproducing signal in which spatial frequency characteristics are corrected; and decoding means for decoding an information signal in accordance with a partial response method based on the reproducing signal output from the calculation means.

With the above calculation, the frequency characteristics comparable to those by a conventional electrical equalizing operation can be obtained. Namely, the characteristics in response to the spatial frequency can be obtained by the respective outputs detected by the light receiving areas in the track direction.

BRIEF DESCRIPTION OF THE DRAWINGS

FIG. 12 illustrates a conventional partial response transmitting method.

DESCRIPTION OF THE PREFERRED EMBODIMENTS

A reproducing apparatus of the present invention will now be explained with reference to the following features in the given order.

<1. Schematic Configuration of First Embodiment>
<2. Schematic Configuration of Second Embodiment>
<3. Discs>
<4. Configuration of Reproducing Apparatus>
<5. Examples (i) and (ii) of the Configuration of the Optical System>
<6. Specific Example (i) of the Circuit for Implementing the First Embodiment>
<7. Specific Example (i) of the Circuit for Implementing the Second Embodiment>
<8. Specific example (ii) of the Circuit for Implementing the First Embodiment>
<9. Specific Example (ii) of the Circuit for Implementing the Second Embodiment>

<1. Schematic Configuration of First Embodiment>

Figure 1A:
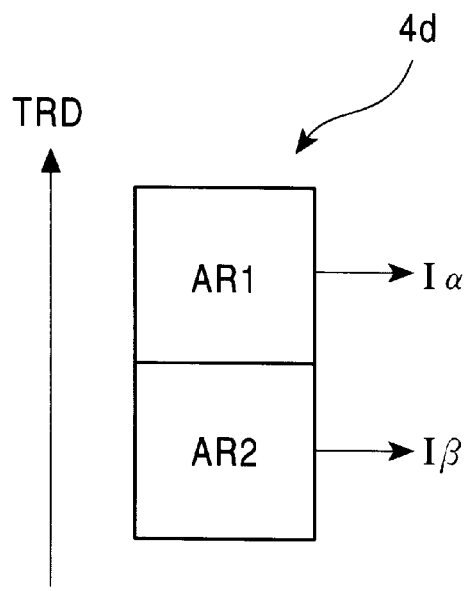
FIG. 1, which is comprised of FIGS. 1A and 1B, schematically illustrates the configuration of a first embodiment of the present invention.
Figure 1B:
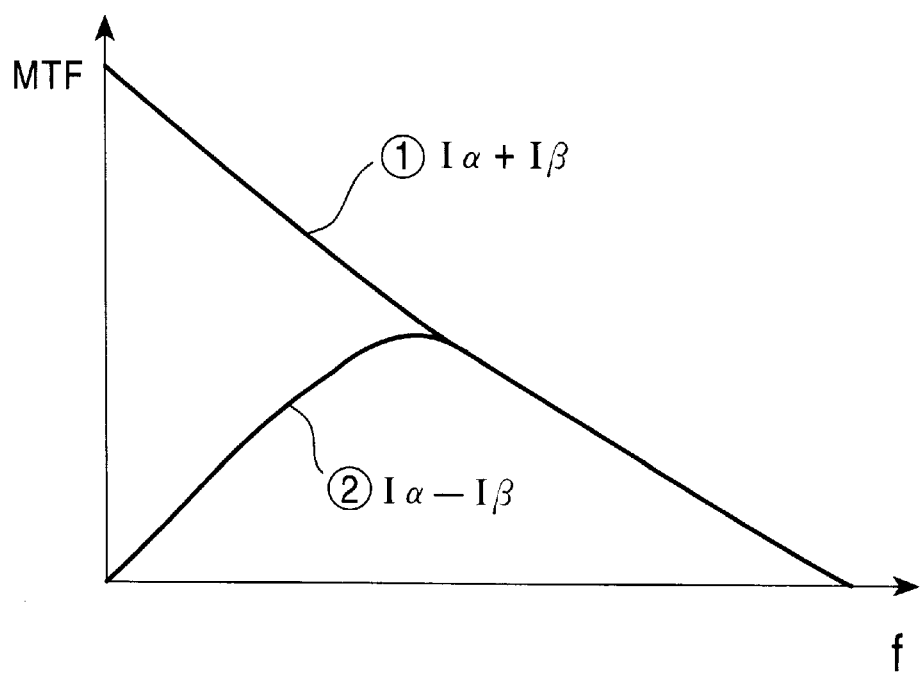

FIGS. 1A and 1B illustrate the schematic configuration of a first embodiment of the present invention. The arrow TRD indicates the light receiving direction corresponding to the track line of a disc. A detector 4d for receiving the light reflected by the laser spots and scanning in the track direction TRD is divided into light receiving areas AR1 and AR2, as shown in FIG. 1A. Namely, the detector 4d is divided into two light receiving areas AR1 and AR2 by a line perpendicular to the light receiving direction corresponding to the track direction TRD of the disc. In this embodiment, the light receiving areas AR1 and AR2 have the same area.

It will now be assumed that the detection outputs photoelectrically converted by the light receiving areas AR1 and AR2 are indicated by signals I$\alpha$ and I$\beta$, respectively. Then, the reproducing data is obtained in the following manner. Calculations are performed on the signals I$\alpha$ and I$\beta$ to specifically correct the spatial frequency characteristics, and then, the calculated signals are decoded.

The frequency characteristics of the signals detected and output by the detector 4d are shown in FIG. 1B. Signals used for performing a typical decoding operation should correspond to the quantity of light detected by a single detector. Accordingly, the sum signal (I$\alpha$+I$\beta$) is used in the embodiment illustrated in FIG. 1A, and the frequency-vs.-modulation transfer function (MTF) characteristics of the sum signal (I$\alpha$+I$\beta$) are indicated by the curve ① of FIG. 1B. The above type of characteristics are required to be equalized before being decoded.

However, the signal obtained by the calculation (I$\alpha$−I$\beta$) has an electrical differential effect, and the frequency-vs.-MTF characteristics are represented by the curve ② shown in FIG. 1B. Upon comparison of the frequency characteristics indicated by the curve ② with the frequency characteristics obtained according to the partial response PR (1, 0, −1) method shown in FIG. 12, the characteristics of the signal (I$\alpha$−I$\beta$) are equivalent to those obtained when the equalizing operation is suitably performed according to the partial response PR (1, 0, −1) method.

Namely, according to the first embodiment, the signal (I$\alpha$−I$\beta$) is obtained from the outputs of the two light receiving areas AR1 and AR2 which are divided by a line perpendicular to the light receiving direction corresponding to the disc-track direction TRD. This makes it possible to make frequency corrections suitable for the partial response PR (1, 0, −1) method without performing an electrical equalizing operation. Further, in this technique, the detection outputs of the respective light receiving areas of the detector 4d having a spatial difference are calculated. Accordingly, the correction is made on the frequency characteristics appropriately in response to the spatial frequency, and thus, the corrected characteristics naturally correspond to changes in the linear velocity.

<2. Schematic Configuration of Second Embodiment>

Figure 2A:
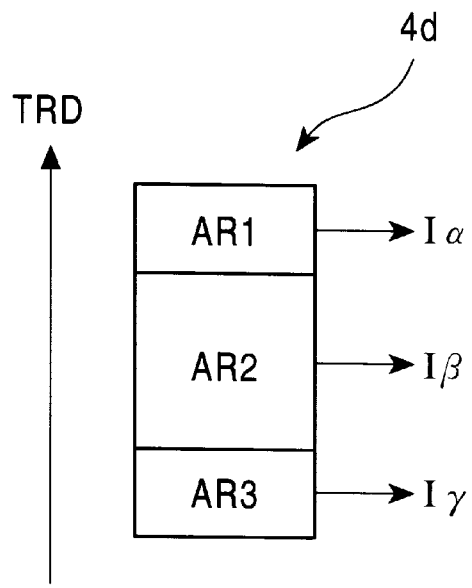
FIG. 2, which is comprised of FIGS. 2A and 2B, schematically illustrates the configuration of a second embodiment of the present invention.

The schematic configuration of a second embodiment will now be described with reference to FIGS. 2A and 2B. In this embodiment, as in the first embodiment, the arrow TRD indicates the light receiving direction associated with the track line of a disc. The detector 4d for receiving the light reflected by the laser spots and scanning in the track direction is divided into three light receiving areas AR1, AR2 and AR3, as illustrated in FIG. 2A. That is, the detector 4d has three light receiving areas AR1, AR2, and AR3 divided by lines perpendicular to the light receiving direction corresponding to the disk track direction TRD.

It will now be assumed that the detection outputs, photoelectrically converted by the light receiving areas AR1, AR2 and AR3, are indicated by signals I$\alpha$, I$\beta$, and I$\gamma$, respectively. Then, the reproducing data is obtained in the following manner. Calculations are made on the signals I$\alpha$, I$\beta$, and I$\gamma$ to specifically correct the specific spatial frequency characteristics, and the calculated signal is then decoded.

Figure 2B:
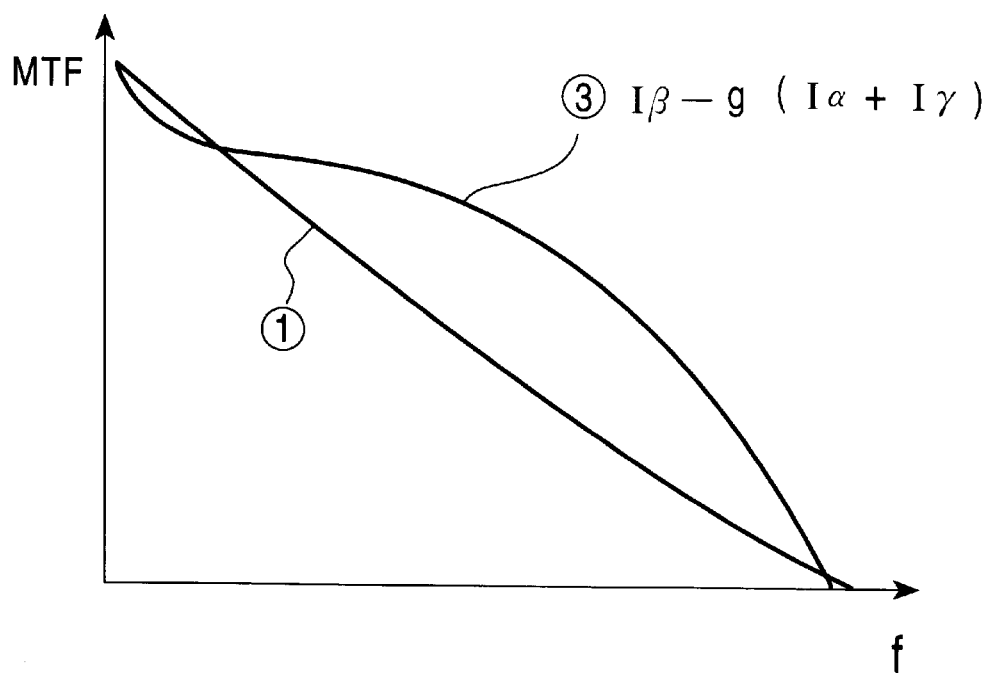

The frequency characteristics of the signal detected and output by the detector 4d are shown in FIG. 2B. The curve ① shown in FIG. 2B is similar to the curve ① of FIG. 1B representing the signal (I$\alpha$+I$\beta$) indicating the quantity of light detected by the detrector 4d. In this embodiment, the signal (I$\alpha$+I$\beta$+I$\gamma$) represents the quantity of light detected by the detector 4d.

However, the signal obtained by a calculation expressed by I$\beta$−g(I$\alpha$+I$\gamma$) has the frequency-vs.-MTF characteristics indicated by the curve ③ of FIG. 2B. Upon comparison of the frequency characteristics represented by the curve ③ with the frequency characteristics obtained according to the partial response PR (1, 1) method shown in FIG. 12, the characteristics of the signal I$\beta$−g(I$\alpha$+I$\gamma$) are equivalent to those obtained when the equalizing operation is appropriately performed in accordance with the partial response PR (1, 1) method.

Namely, in the second embodiment, the signal I$\beta$−g(I$\alpha$+I$\gamma$) is obtained from the outputs of the three light receiving areas AR1, AR2 and AR3 divided by lines perpendicular to the light receiving direction corresponding to the track direction TRD. This makes it possible to perform a suitable frequency correction in accordance with the partial response PR (1, 1) method without needing to perform an electrical equalizing operation. Further, in this technique, the detection outputs of the respective light receiving areas AR1, AR2 and AR3 of the detector 4d having a spatial difference are calculated. Accordingly, the correction is made on the frequency characteristics appropriately in response to the spatial frequency, and thus, the corrected characteristics naturally correspond to changes in the linear velocity.

In the above calculation, "g", which is a coefficient, can be set according to the various conditions. If the coefficient g is set to satisfy the conditions expressed by the equation I$\beta$=g(I$\alpha$+I$\gamma$), i.e., g=I$\beta$/(I$\alpha$+I$\gamma$), the common-mode noise rejection conditions in the light receiving areas AR1, AR2 and AR3 are met. Since the coefficient g is set in the above manner, the common-mode noise components included in the signals I$\beta$, I$\alpha$ and I$\gamma$ are canceled. The frequency characteristics indicated by the curve ③ of FIG. 2B are by way of example only, and the frequency characteristics are determined by the coefficient g and the area ratio of the light receiving areas AR1, AR2 and AR3.

<3. Discs>

Before explaining a reproducing apparatus using the foregoing detector having divided light receiving areas, discs which are usable in the reproducing apparatus will first be described.

Figure 10:
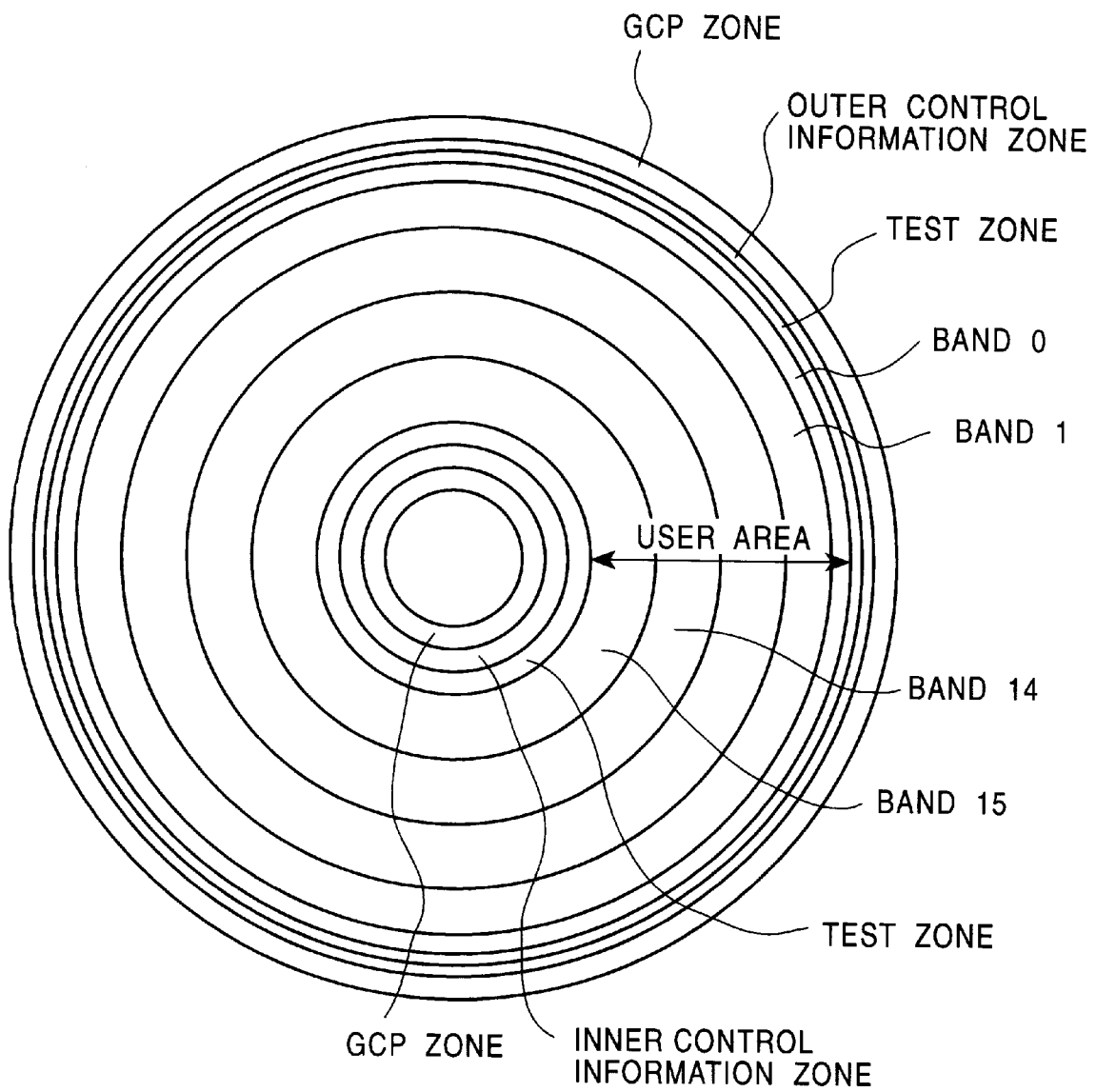
FIG. 10 illustrates a disc used in the first and second embodiments of the present invention.
Figure 11:
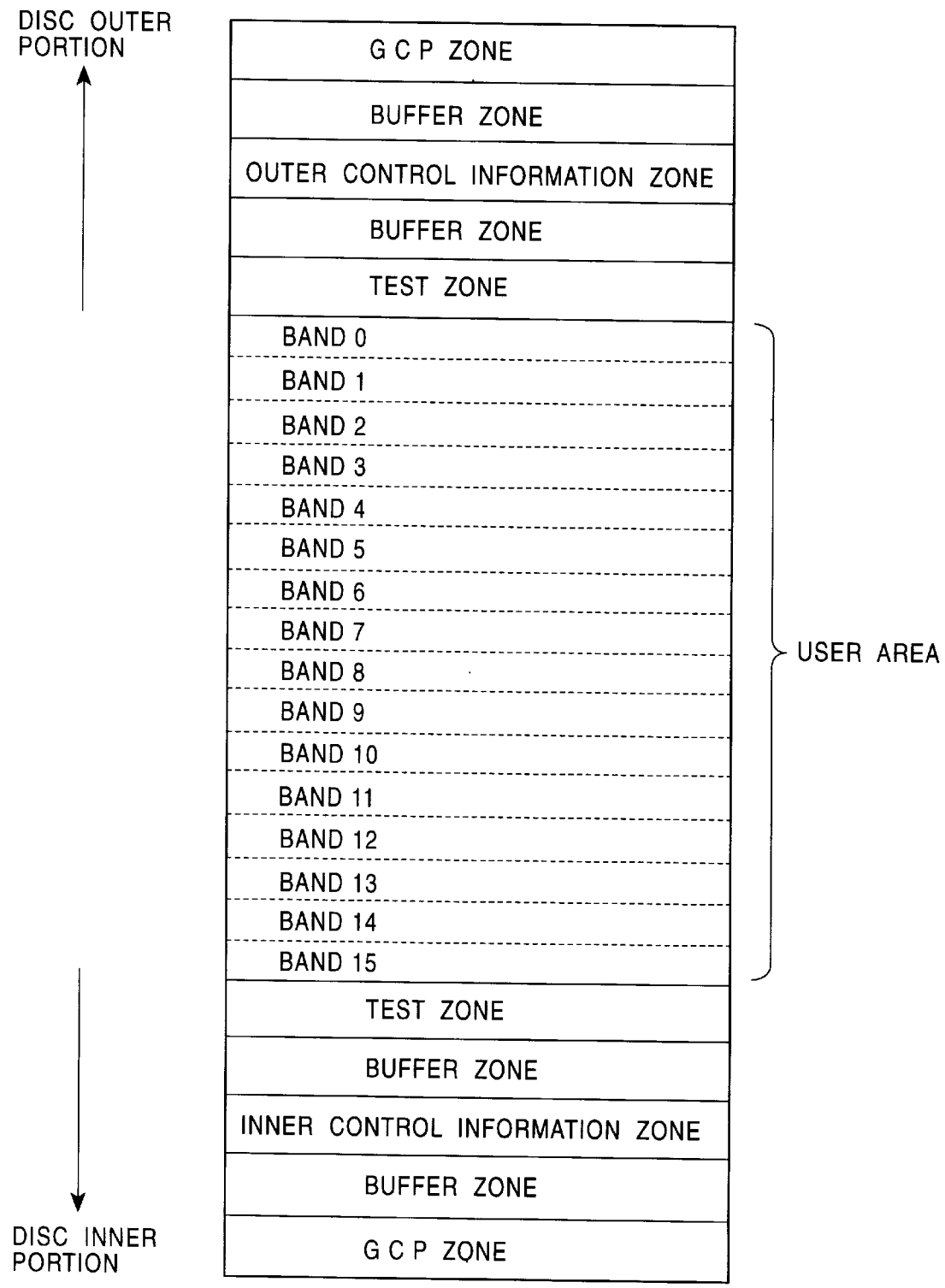
FIG. 11 illustrates the zone configuration of a disc used in the first and second embodiments of the present invention.

The optical discs used in this embodiment are the type of a zone CAV optical disc. FIGS. 10 and 11 illustrate the zone structure from the outer peripheral portion to the inner peripheral portion. FIG. 10 illustrates the zone structure in a disc image, while FIG. 11 schematically illustrates the zone structure in the radial direction of the disc.

FIGS. 10 and 11 show that a Gray Code Part (GCP) zone having 736 tracks is disposed at the outermost peripheral portion of the disc, and a buffer zone (2 tracks), an outer control information zone (5 tracks), a buffer zone (2 tracks), and a test zone (5 tracks) are sequentially provided toward the inner peripheral portion of the disc. The buffer zones are not shown in FIG. 10.

Continuously from the test zone, a user area is formed as a main data area consisting of a rewritable zone ARW on which the user is able to record certain data and a ROM zone AE from which the data is reproduced only. The user area is divided into 16 bands (16 zones) from band 0 to band 15. Predetermined numbers of tracks are defined for the respective bands. For example, band 0 has 848 tracks, band 1 has 864 tracks, band 2 has 880 tracks, and so on.

Provided further inward than the user area are a test zone (5 tracks), a buffer zone (2 tracks), an inner control information zone (5 tracks), a buffer zone (2 tracks), and a GCP zone (820 tracks). The GCP zone, the outer control information zone, and the inner control information zone are used for recording the predetermined control information rather than for recording user data. The foregoing disc is the type of a zone CAV disc. In the zone CAV method, an optical disc is rotated at a constant velocity, and the clock frequency of the data to be recorded in each zone (band) is varied, thereby making the recording density levels of the respective zone substantially uniform. This makes it possible to readily control the rotation of the disc and also to increase the recording capacity compared with the simple CAV method.

Since the linear velocity of the zone becomes higher toward the outer peripheral portion of the disc, the frequency of the data clock DCK for data reading should be higher toward the outer peripheral portion. On the other hand, the servo clock SCK used for the servo operation, which will be described later, has a constant frequency regardless of the position of the zone. The data clock DCK has a frequency equal to M/N times the servo clock SCK.

The 16 bands of the user area may be wholly used as a ROM zone AE on which data is recorded as embossed pits. Alternatively, lands/groups serving as magneto-optical zones may be formed, and then, the 16 bands may be used as rewritable zones ARW on which the user is able to perform recording/reproducing operations as required. The number of rewritable zones ARW and ROM zones AE can be desirably set by the manufacturer.

<4. Configuration of Reproducing Apparatus>

Figure 3:
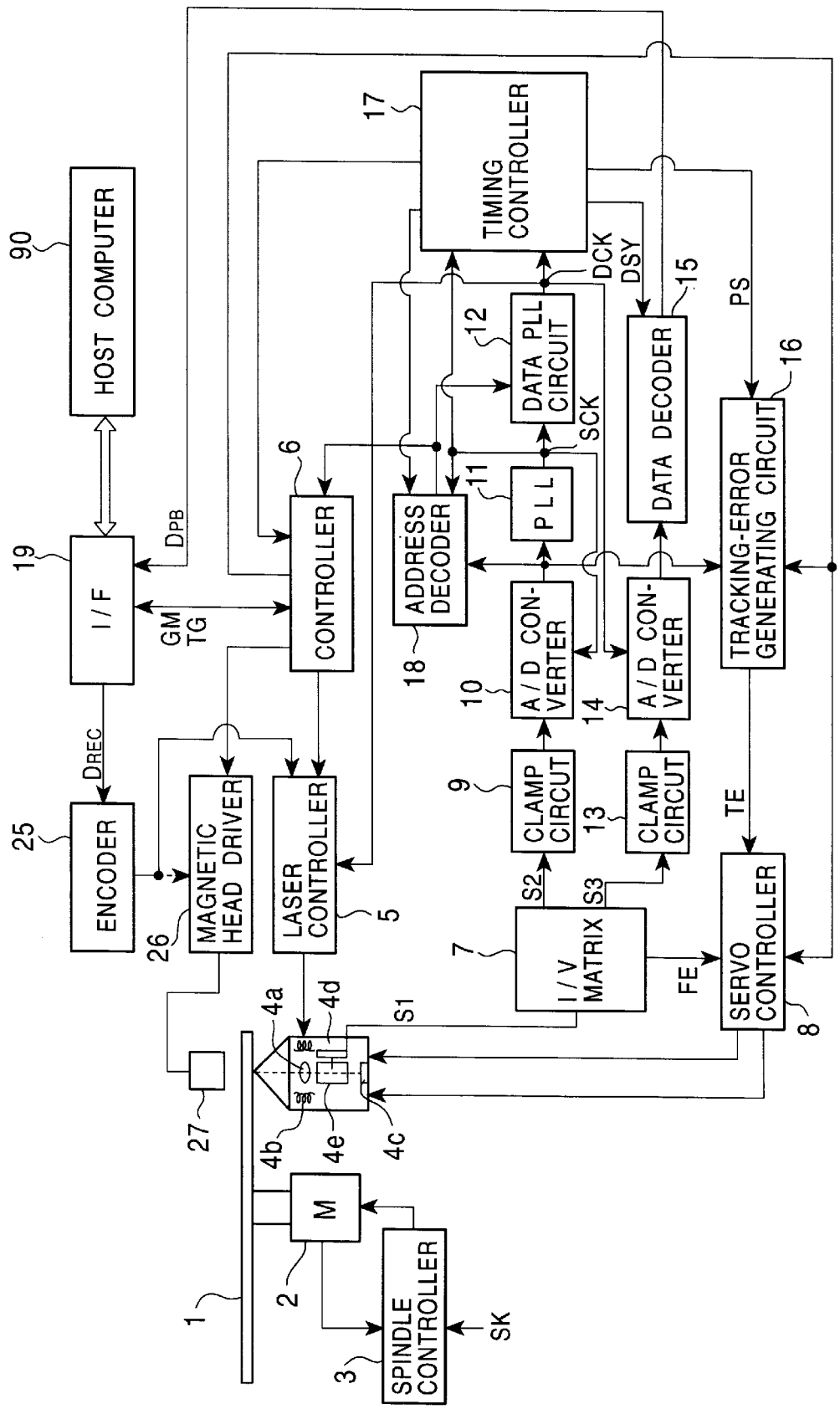
FIG. 3 is a block diagram of a recording/reproducing apparatus used in the first and second embodiment.

The recording/reproducing apparatus for recording on and reproducing from the above-described disc will now be explained with reference to the block diagram of FIG. 3.

An optical disc 1 is of the type of disc formatted in the above-described manner. The optical disc 1 may be a ROM disc, a RAM disc, or a partial ROM disc in which ROM zones and rewritable zones are mixed, according to the mode of the user area. The optical disc 1 is rotated at a predetermined rotational velocity by a spindle motor 2. The servo control of the rotational velocity of the spindle motor 2 is performed by a spindle controller 3. For example, the spindle controller 3 detects the rotational velocity of the spindle motor 2 by a FG pulse (a frequency signal synchronizing with the rotating velocity) from the spindle motor 2. The spindle controller 3 also receives reference velocity information SK from a controller 6 and compares the rotational velocity of the spindle motor 2 with the reference velocity information SK to obtain error information. Then, the spindle controller 3 increases or decreases the velocity of the spindle motor 2 based on the error information, thereby causing the spindle motor 2 to rotate at a required velocity.

The rotating optical disc 1 is irradiated with laser light from an optical pickup 4. The optical pickup 4 has a laser light source 4c, such as a laser diode or a laser coupler, an optical system 4e formed of, for example, various lenses and a beam splitter, an objective lens 4a serving as the output terminal of the laser light, a detector 4b for detecting the light reflected from the disc 1, and a biaxial mechanism 4d for movably holding the objective lens 4a both in the tracking direction and in the focusing direction. In the optical pickup 4, the on/off switching operation and the output level of the laser output from the laser light source 4c are controlled by a laser controller 5.

The recording/reproducing apparatus constructed as described above is connected to a computer 90 via an interface 19, and the data recording/reproducing operation is performed by supplying a recording instruction or a reproducing instruction from the host computer 90 to the controller 6. During the recording operation, recording data, as well as a recording instruction, is supplied from the host computer 90. The recording data $D_{REC}$ is fed to an encoder 25 via the interface 19 and is encoded by the encoder 25, for example, with the nonreturn-to-zero interchange (NRZI) encoding method using the partial response PR (1, 0, −1) or PR (1, 1) technique.

If the disc 1 is a RAM disc or a partial ROM disc, the data can be magneto-optically recorded on a rewritable zone of the disc 1. The recording method is, however, largely divided into the light modulation method and the magnetic-field modulation method.

In the light modulation method, laser light is modulated by the recording data while an external magnetic field is applied to the disc recording surface in a fixed perpendicular direction. More specifically, during the recording operation, the controller 6 drives a magnetic head driver 26 to cause a magnetic head 27 to apply an N or S external magnetic field to the disc recording surface. The recording data encoded by the encoder 25 is supplied to the laser controller 5 which then switches on or off the laser output from the laser light source 4c according to the recording data. The disc recording surface partially irradiated with the laser light is changed to the polarity of the external magnetic field, and thus, the recording data is recorded on the disc 1 as magnetic information.

The other recording method, i.e, the magnetic modulation method, can further be divided into a simple magnetic modulation method and a laser strobe magnetic modulation method. In the former method, a magnetic field to be modulated based on the recording data is applied to the disc recording surface which is continuously irradiated with a fixed quantity of laser light. In the latter method, a magnetic field to be modulated based on the recording data is applied to the disc recording surface, and the laser light is emitted in a pulsating manner.

Whichever method is used, the magnetic modulation method is performed in the following manner. During the recording operation, the controller 6 controls the laser controller 5 in such a manner that the laser light is emitted continuously or in a pulsating manner from the laser light source 4c. The recording data encoded by the encoder 25 is fed to the magnetic head driver 26 which then causes the magnetic head 27 to apply an N or S magnetic field to the magnetic recording surface in accordance with the recording data. The recording data is thus recorded on the disc 1 as magnetic information.

The data reading position of the optical pickup 4 is radially movable. A sled mechanism (not shown) is provided for driving the overall optical pickup 4 movable in the disk radial direction. This makes it possible to move the optical pickup 4 to the laser applying positions within a great distance between tracks. The optical pickup 4 is also able to move to the laser applying positions within a small distance between tracks by the tracking servo operation in which the objective lens 4a is moved in the disc radial direction by the biaxial mechanism 4b.

In place of the sled mechanism for moving the optical pickup 4, a mechanism for sliding the disc 1 together with the spindle motor 2 may be provided. Further, the objective lens 4a is moved by the biaxial mechanism 4b toward and away from the disc 1, thereby performing focus control of the laser spots.

The disc 1 is loaded in the recording/reproducing position by a loading mechanism (not shown), and the spindle motor 2 drives the disc 1 to start rotating. When the disc 1 reaches a predetermined rotational velocity, the reading position of the disc 1 is controlled so that the optical pickup 4 is able to read the data stored in the GCP zone formed at the inner or the outer peripheral portion of the disc 1. Based on the information stored in the GCP zone, required initial processing, such as focusing, is performed. The recording or reproducing operation in response to the instruction from the host computer 90 is then started.

The detector 4d used in the optical pickup 4 is adapted to extract the reproducing data and servo error signals. For extracting the reproducing data, the optical system 4e and the detector 4d of the optical pickup 4 should be configured to obtain both the information corresponding to the embossed pits of the disc 1 and the information associated with the magnetic pits. More specifically, the magnetic data (MO data) of each polarized-light component stored in the rewritable zone is detected by utilizing the Kerr effect, thereby obtaining an RF signal as MO data. An RF signal indicating the quantity of light in accordance with the embossed pit is also obtained. An example of the configuration of the optical system 4e will be described in greater detail with reference to FIG. 5.

If the disc 1 is restricted to the type in which all the data items are formed as embossed pits, i.e., a ROM disc, the optical system 4e is not required to be configured to obtain an RF signal as MO data. Such an optical system will also be explained with reference to FIG. 4.

A current signal S1 corresponding to the quantity of light is output from each light receiving area of the detector 4d and supplied to a current-to-voltage (I/V) conversion matrix amplifier 7. The I/V conversion matrix amplifier 7 converts the light-quantity current signal S1 into a voltage signal. The matrix amplifier 7 also generates an embossed-pit information signal and a magnetic-pit information signal and a focus error signal FE by making calculations on the signals from the respective light receiving areas.

The focus error signal FE representing focus error information is fed to the servo controller 8. The servo controller 8 is loaded with a focus phase compensation circuit and a focus driver, both of which serve as a focus system processing unit. The servo controller 8 then generates a focus drive signal based on the focus error signal FE and applies it to a focus coil used in the biaxial mechanism 4b. In this manner, a focus servo system is constructed in which the objective lens 4a is caused to converge into the just focus point.

Output from the I/V conversion matrix amplifier 7 is an RF signal S2 used for generating a servo clock SCK and a data clock DCK. The signal S2 is supplied to a clamp circuit 9 in which the low-frequency fluctuations of the signal S2 are removed. The resulting signal S2 is further fed to an analog-to-digital (A/D) converter 10 in which the signal S2 is converted into a digital signal. The digital signal is supplied to an address decoder 18, a PLL circuit 11, and a tracking-error generating circuit 16.

The PLL circuit 11 controls the oscillation frequency of the internal oscillator based on the phase difference between the input signal and the oscillation output, and also performs a scaling operation, thereby generating a servo clock SCK synchronizing with the RF signal. The generated servo clock SCK is used as a sampling clock for the A/D converter 10 and is also fed to the address decoder 18 and a timing controller 17. A data PLL circuit 12 scales the servo clock SCK to produce a data clock DCK, which is then supplied to the timing controller 17, an A/D converter 14, and the laser controller 5.

The timing controller 17 generates timing signals required for the respective elements based on the servo clock SCK and the data clock DCK. For example, a sampling timing signal P5 for performing a servo pit tracking operation and a synchronizing timing signal DSY for the decoding operation performed by a data decoder 15 are generated. The timing controller 17 also instructs the address decoder 18 on the timing for extracting the address information. The address decoder 18 then decodes the digital data output from the A/D converter 10 by using the servo clock SCK during the timing period instructed by the timing controller 17, thereby extracting the address data. The address data is supplied not only to the controller 6 and but also to the data PLL circuit 12. The data PLL circuit 12 then switches the scaling ratio in order to switch the data clock DCK in response to the disc radial position (zone) which can be determined by the address data.

The tracking-error generating circuit 16 in conjunction with the timing controller 17 generates a tracking error signal TE by performing, for example, three-phase tracking control, and supplies it to the servo controller 8. The tracking error signal TE is produced from the signal corresponding to, which is referred to as "the servo pit", on the disc 1, though a detailed explanation is not given.

When data is reproduced from a ROM zone, an RF signal as a signal S3 used for extracting embossed pit data is output from the I/V conversion matrix amplifier 7. Further, when data is reproduced from a rewritable zone, an MO signal representing magnetic pit information is output as a signal S3. The signal S3 is supplied to a clamp circuit 13 in which the low-frequency fluctuations of the signal S3 are eliminated. The resulting signal S3 is then digitized in the A/D converter 14.

The digital signal is further supplied to the data decoder 15. The data decoder 15 then decodes the digital data in accordance with the synchronizing timing DSY which is generated based on the data clock DCK by the controller 17, thereby obtaining reproducing data $D_{PB}$. The reproducing data $D_{PB}$ is supplied to the host computer 90 via the interface 19.

As the decoding operation by the data decoder 15, for example, filtering and Viterbi decoding suitably corresponding to the partial response PR (1, 0, −1) method are performed when the detector 4d and the I/V conversion matrix amplifier 7 are configured as described in the first embodiment shown in FIG. 1. In this embodiment, however, the frequency characteristics equivalent to the characteristics which would be obtained by the partial response PR (1, 0, −1) method are already obtained by the below-described calculations by the I/V conversion matrix amplifier 7. Thus, an equalizing operation, which would be required after the partial response PR (1, 0, −1) method is performed, is unnecessary.

If the detector 4d and the I/V conversion matrix amplifier 7 are configured in accordance with the second embodiment illustrated in FIG. 2, filtering and Viterbi decoding suitably associated with the partial response PR (1, 1) method are performed as the decoding operation. In this case, as well as in the previous case, the frequency characteristics corresponding to the partial response PR (1, 1) method are already obtained by the below-described calculations preformed by the I/V conversion matrix amplifier 7, thereby eliminating the need for performing an equalizing operation.

<5. Examples (i) and (ii) of the Configuration of the Optical System>

Figure 4:
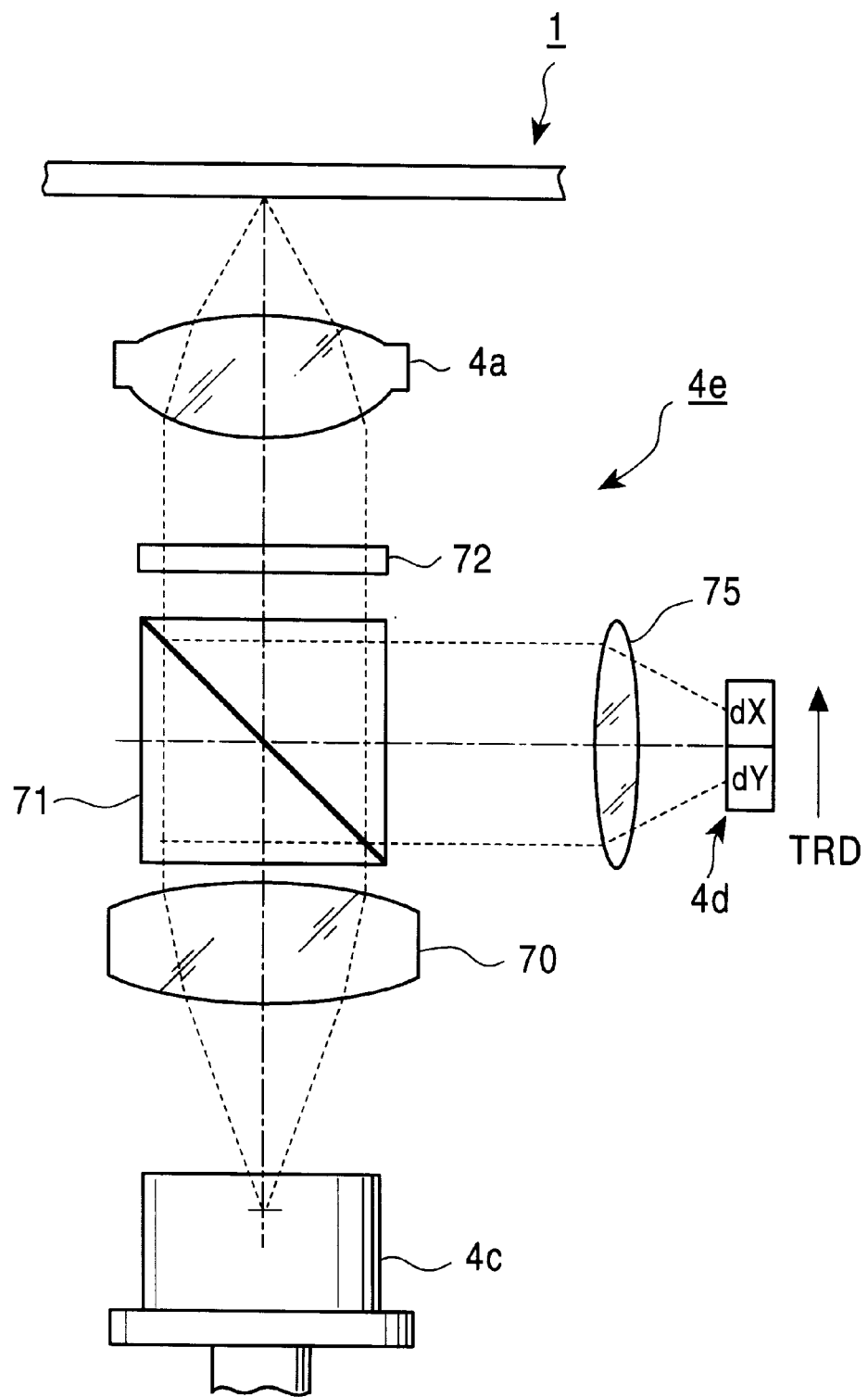
FIG. 4 illustrates an example (i) of the configuration of an optical system used in the recording/reproducing apparatus of the first and second embodiments.
Figure 5:
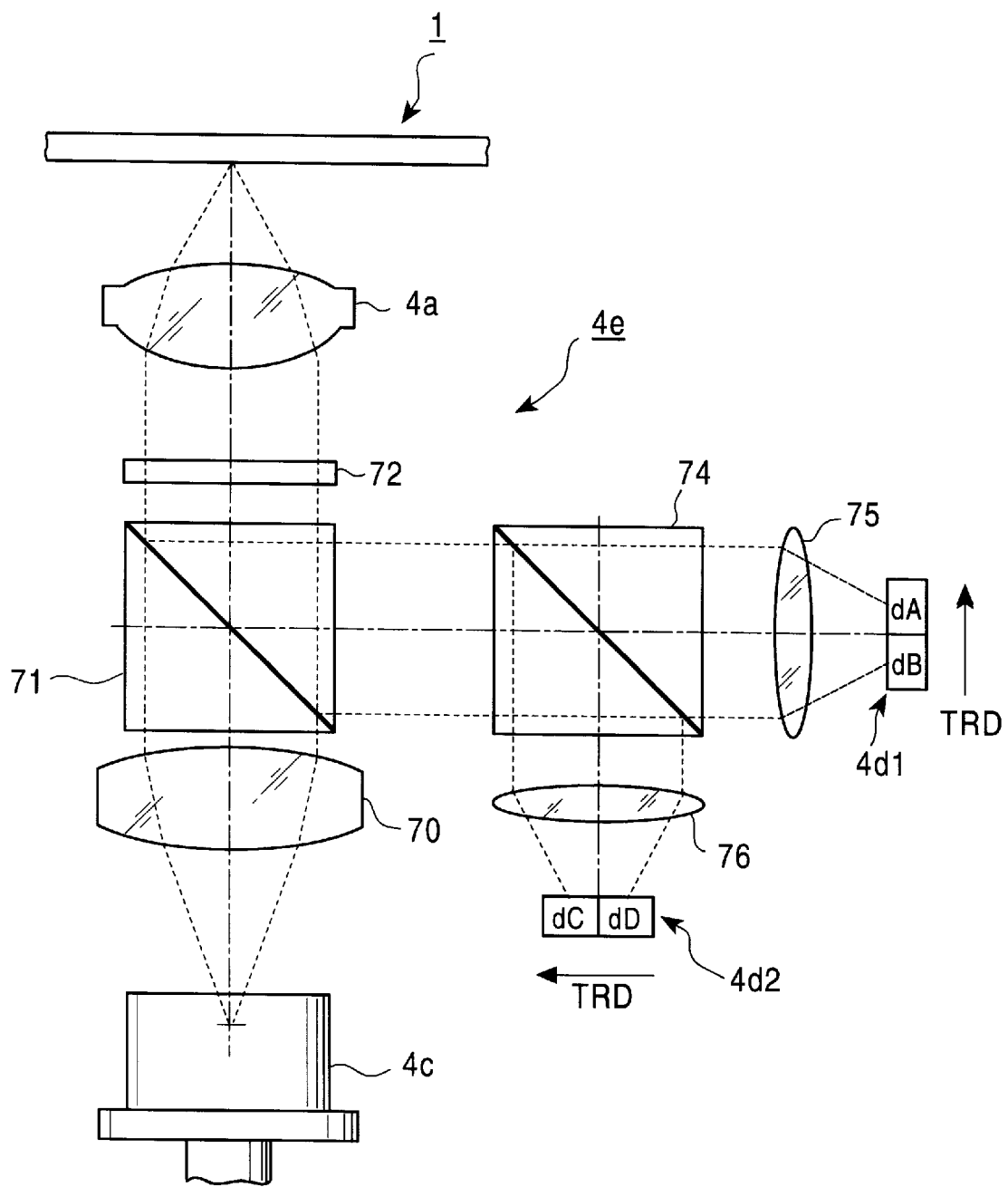
FIG. 5 illustrates an example (ii) of the configuration of an optical system used in the recording/reproducing apparatus of the first and second embodiments.

Two examples of the configuration of the optical system which are usable for the optical pickup 4 are respectively shown in FIGS. 4 and 5. The optical system illustrated in FIG. 4 as an example (i) is a type which is able to obtain reproducing information corresponding to the embossed pits of the ROM zones of the disc 1. In contrast, the optical system shown in FIG. 5 as an example (ii) is a type that is able to obtain reproducing information corresponding to both the magnetic pits of the rewritable zones and the embossed pits of the ROM zones of the disc 1.

The above examples of optical systems and examples of the I/V conversion matrix amplifier 7 will be sequentially explained with reference to FIGS. 4 through 7. In the I/V conversion matrix amplifier 7, an explanation will be given only of the elements for generating the signals S2 and S3 shown in FIG. 3, and the elements for producing the focus error signals will be omitted.

A reference will first be given to FIG. 4 illustrating the example (i) of the optical system.

In the optical pickup 4, a laser beam emitted from the laser light source 4c is guided to the objective lens 4a, which serves as the output terminal of the laser beam, via the optical system 4e. The optical system 4e is formed of a collimator lens 70, a beam splitter 71, and a ½ wave plate 72. The light reflected by the disc 1 is first incident on the objective lens 4a and travels to the ½ wave plate 72 and the beam splitter 71. The light partially reflected by the beam splitter 71 is condensed by a lens 75 and is further applied to the detector 4d.

With the above configuration, the detector 4d, which extracts the embossed pit information, is divided into light receiving areas dX and dY. The arrow TRD shown in FIG. 4 indicates the track direction of the light receiving surface of the disc 1. Accordingly, the detector 4d is divided into the two areas dX and dY by a line perpendicular to the track direction TRD, in other words, the detector 4d is configured, as has been explained with reference to FIG. 1.

The example (ii) of the optical system shown in FIG. 5 will now be described.

In the optical pickup 4, a laser beam emitted from the laser light source 4c is guided to the objective lens 4a, which serves as the output terminal of the laser beam, via the optical system 4e. The optical system 4e is formed of a collimator lens 70, a beam splitter 71, and a ½ wave plate 72. The light reflected by the disc 1 is first incident on the objective lens 4a and further travels to the ½ wave plate 72 and the beam splitter 71. The light partially reflected by the beam splitter 71 is guided to a polarization beam splitter 74. Then, the light partially passing through the polarization beam splitter 74 is condensed by a lens 75 and is applied to a detector 4d1. Meanwhile, the light reflected by the polarization beam splitter 74 is condensed by a lens 76 and is applied to a detector 4d2.

With the above configuration, the detectors 4d1 and 4d2 are adapted to detect the embossed pit information and the magnetic pit information, respectively. The detector 4d1 is divided into light receiving areas dA and dB, while the detector 4d2 is split into light receiving areas dC and dD. The arrows TRD shown in FIG. 5 indicate the directions associated with the track direction of the disc 1. Accordingly, the detectors 4d1 and 4d2 are divided by a line perpendicular to the track directions TRD, respectively, i.e., the detectors 4d1 and 4d2 are constructed, as explained with reference to FIG. 1.

<6. Specific Example (i) of the Circuits for Implementing the First Embodiment>

Figure 6:
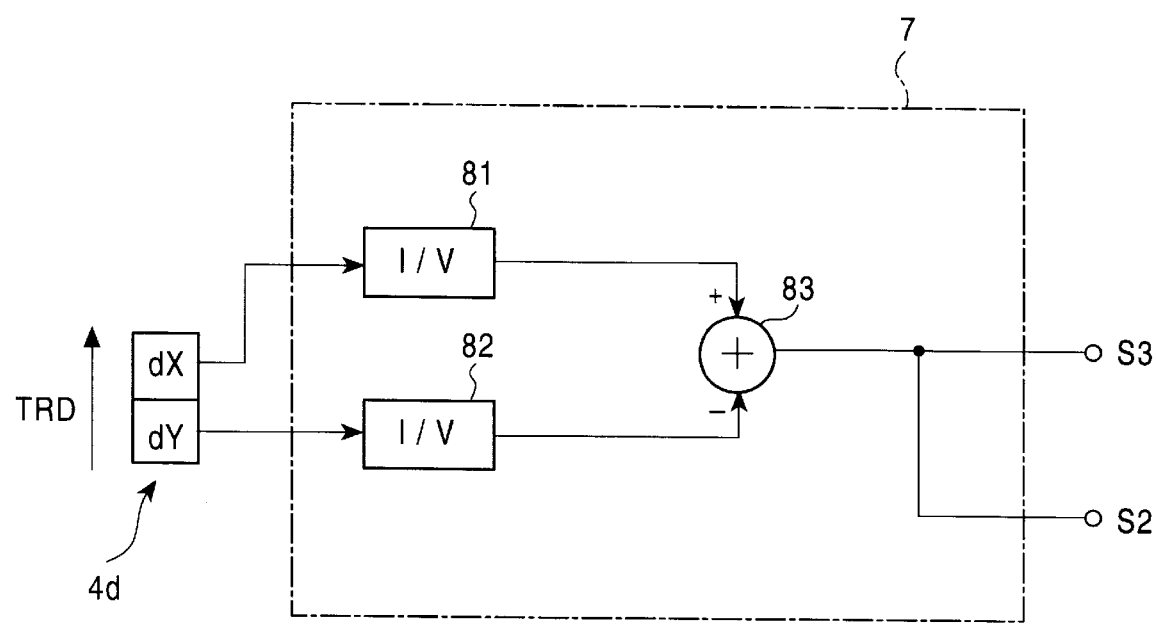
FIG. 6 is a block diagram of a current-to-voltage (I/V) conversion matrix amplifier compatible with the example (i) of the optical system according to the first embodiment of the present invention.

When the optical pickup 4 is configured as the example (i) illustrated in FIG. 4, the I/V conversion matrix amplifier 7 may be configured as shown in FIG. 6 as a specific example (i) of the circuit for implementing the first embodiment. The I/V conversion matrix amplifier 7 generates the signal S3 for obtaining the reproducing data from the signals detected by the light receiving areas dX and dY of the detector 4d. The circuitry system shown in FIG. 6 is restricted to the elements of the matrix amplifier 7 related to the processing of the signals S2 and S3. This circuitry system is formed of I/V conversion circuits 81 and 82, and a subtracter 83.

The current signals, photoelectrically converted by the respective light receiving areas dX and dY of the detector 4d, are supplied to the I/V conversion matrix amplifier 7. In the matrix amplifier 7, the current signals are first converted, as illustrated in FIG. 6, into voltage signals by the I/V conversion circuits 81 and 82, respectively.

The reflected light information from the embossed pit is determined by the amount of light, as has been discussed above. Thus, the information normally corresponds to the sum of the signals from the respective light receiving areas dX and dY. In this example, however, the signals from the light receiving areas dX and dY are subtracted from each other in the subtracter 83, thereby obtaining the embossed pit information as a light quantity signal detected by the detector 4d, i.e, the pit data signal S3, and the servo pit signal S2.

Namely, the output from the light receiving area dX corresponds to the output from the light receiving area AR1 of the schematic configuration of the detector 4d illustrated in FIG. 1A, while the output form the light receiving area dY is associated with the output from the light receiving area AR2. Consequently, the frequency characteristics of the output (dX−dY) of the subtracter 83 are indicated by the curve ② of FIG. 1B.

The output from the subtracter 83 is supplied as the pit reproducing signal S3 to the subsequent stage, such as the clamp circuit 13, of the reproducing apparatus. Then, the reproducing signal S3 is to be decoded by the data decoder 15 in accordance with the partial response PR (1, 0, −1) transmitting method. The reproducing signal S3 already has the frequency characteristics comparable to those which would have been obtained by performing a suitable equalizing operation. Thus, it is unnecessary to perform an electrical equalizing operation before the reproducing signal S3 is decoded.

<7. Specific Example (i) of the Circuits for Implementing the Second Embodiment>

A specific example of the circuit for achieving the second embodiment shown in FIG. 2 will now be described. In the optical system of the optical pickup 4 configured as the example (i) shown in FIG. 4, the detector 4*d* is divided into three light receiving areas by lines perpendicular to the track direction TRD, as illustrated in FIG. 2. In this example, the three light receiving areas of the detector 4*d* are indicated by dx, dy and dz, respectively, as illustrated in FIG. 7.

Figure 7:
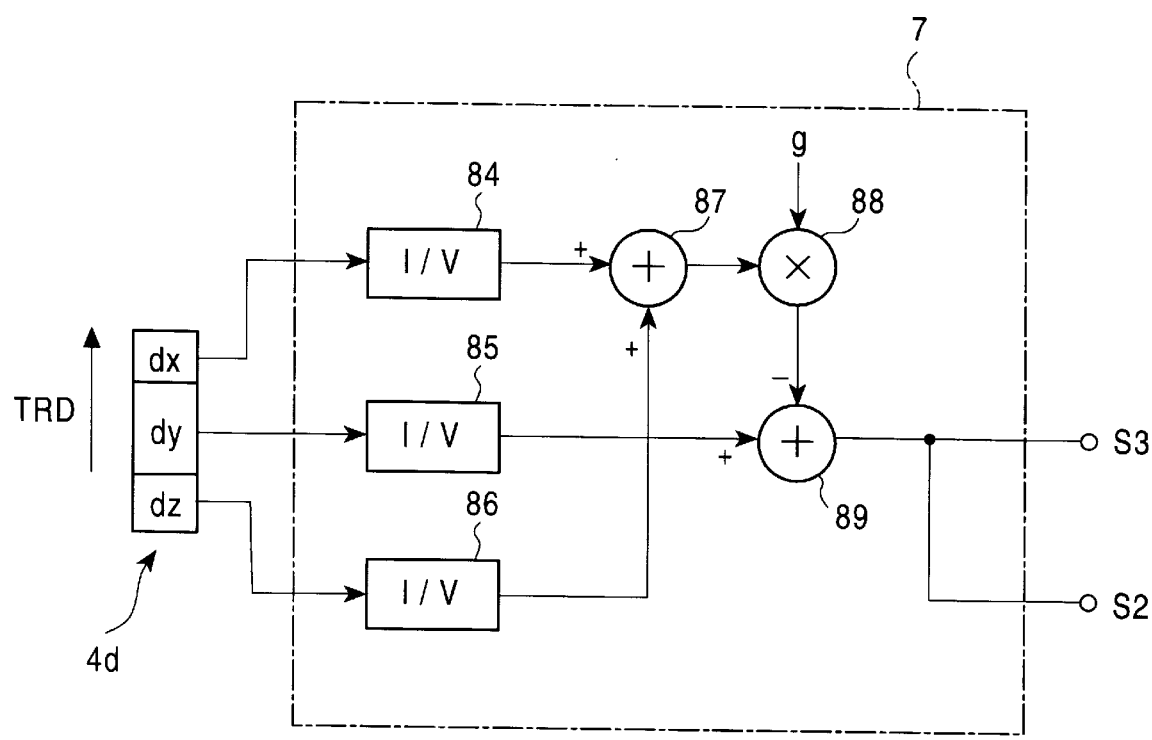
FIG. 7 is a block diagram of an I/V conversion matrix amplifier compatible with the example (i) of the optical system according to the second embodiment of the present invention.

FIG. 7 shows an example of the configuration of the I/V conversion matrix amplifier 7 (only the circuitry system related to the processing of the signal S3 is shown), which generates the signal S3 for obtaining the reproducing data from the signals detected by the light receiving areas dx, dy and dz of the detector 4*d*. This circuitry system of the matrix amplifier 7 is formed of I/V conversion circuits 84, 85 and 86, an adder 87, a multiplier 88, and a subtracter 89.

The current signals, photoelectrically converted by the light receiving areas dx, dy and dz of the detector 4*d*, are first converted into voltage signals by the I/V conversion circuits 84, 85 and 86, respectively. The reflected light information from the embossed pit is determined by the amount of light. Accordingly, the information is normally equal to the sum of the signals from the respective light receiving areas dx, dy and dz. In this example, however, the signals S3 and S2 are generated as the reflected light information from the embossed pit by the operations of the adder 87, the multiplier 88, and the subtracter 89. More specifically, the signals from the respective light receiving areas dx and dz are added by the adder 87, and the output from the adder 87 is fed to the multiplier 88 in which the output signal is multiplied by the coefficient g. The output from the multiplier 88 is further subtracted from the signal from the light receiving area dy by the subtracter 89. Finally, the output of the subtracter 89 is used as the signals S2 and S3.

The signal output from the light receiving area dy and photoelectrically converted by the I/V conversion circuit 85 corresponds to the output from the light receiving area AR2 of the schematic configuration of the detector 4*d* illustrated in FIG. 2A, while the signal (dx+dz) output from the adder 87 is associated with the output from the light receiving areas AR1 and AR3. The output from the adder 87 is multiplied by the coefficient g in the multiplier 88, and the resulting output is further subtracted by the subtracter 89. Namely, the foregoing operations can be expressed by dy−g(dx+dz), which is equal to Iβ−g(Iα+Iγ) shown in FIG. 2B. Thus, the frequency characteristics of the output from the subtracter 89 are indicated by the curve ③ of FIG. 2B.

The output from the subtracter 89 is supplied as the pit reproducing signal S3 to the subsequent stage, such as the clamp circuit 13, of the reproducing apparatus. The signal S3 is to be decoded by the data decoder 15 according to the partial response PR (1, 1) transmitting method. The signal S3 already has the frequency characteristics comparable to those obtained by an equalizing operation, thereby eliminating the need to perform an electrical equalizing operation before the signal S3 is decoded.

<8. Specific Example (ii) of the Circuits for Implementing the First Embodiment>

Figure 8:
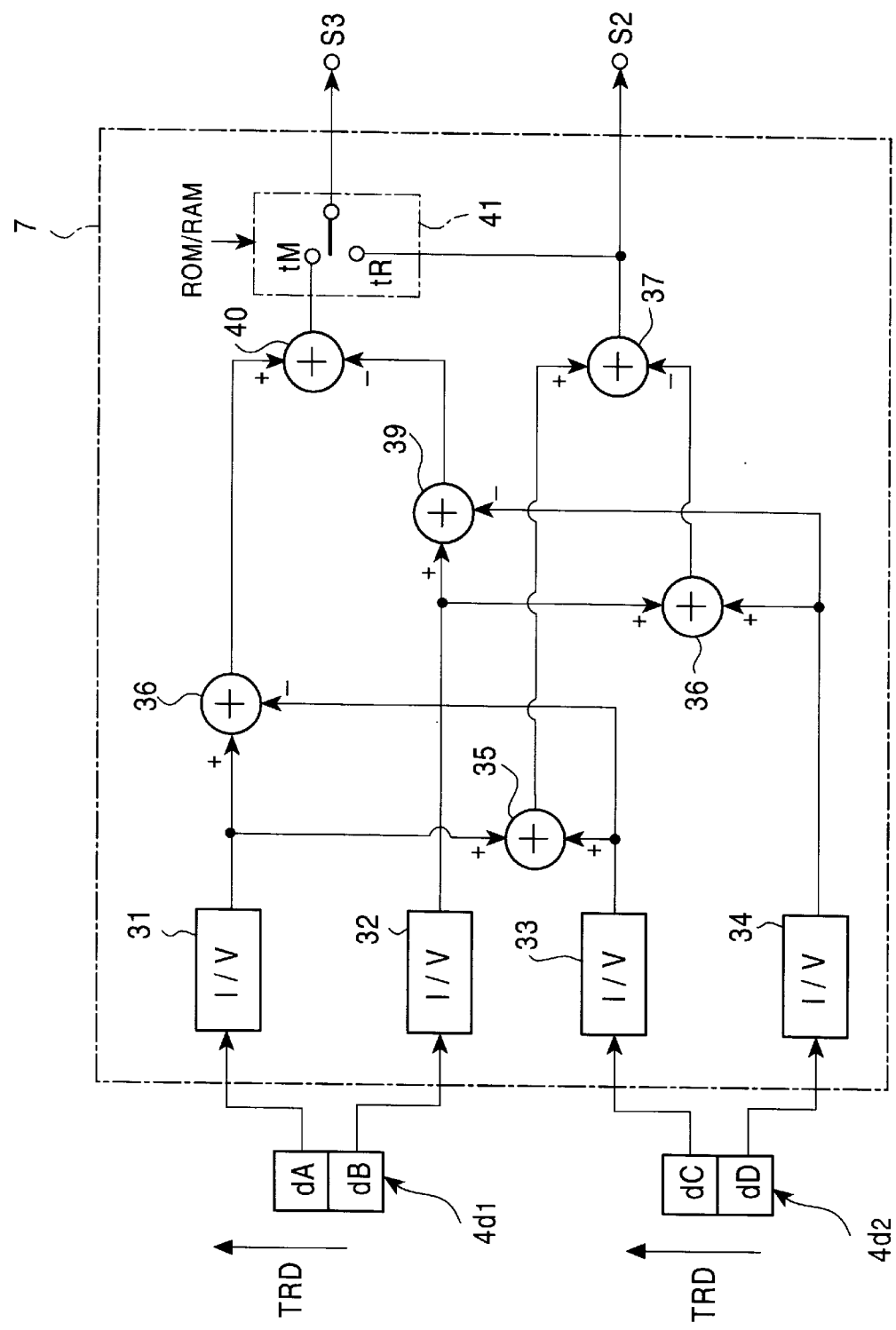
FIG. 8 is a block diagram of an I/V conversion matrix amplifier compatible with the example (ii) of the optical system according to the first embodiment of the present invention.

When the optical pickup 4 is configured as the example (ii) shown in FIG. 5, the I/V conversion matrix amplifier 7 may be configured as illustrated in FIG. 8 as a specific example (ii) of the circuits for implementing the first embodiment. The I/V conversion matrix amplifier 7 generates the signal S3 for obtaining the reproducing data from the signals detected by the detectors 4*d*1 and 4*d*2 shown in FIG. 5.

The circuitry system of the matrix amplifier 7 shown in FIG. 8 is limited to the elements only related to the processing of the signal S3. This circuitry system is formed of I/V conversion circuits 31, 32, 33 and 34, adders 35 and 36, subtracters 37, 38, 39 and 40, and a switch 41.

The current signals, photoelectrically converted by the light receiving areas dA and dB of the detector 4*d*1 and the light receiving areas dC and dD of the detector 4*d*2, are first converted into voltage signals by the I/V conversion circuits 31, 32, 33 and 34, respectively, of the I/V conversion matrix amplifier 7.

Since the reflected light information from the embossed pit represents the amount of light, the information is normally indicated by the sum of the signals from the respective detectors 4*d*1 and 4*d*2. In this example, however, the adders 35 and 36 and the subtracter 37 are used to obtain the signals S3 and S2 representing the reflected light information.

More specifically, the output from the light receiving area dA and the output from the light receiving area dC are added (dA+dC) by the adder 35. Moreover, the output from the light receiving area dB and the output from the light receiving area dD are added (dB+dD) by the adder 36. The output (dA+dC) from the adder 35 corresponds to the output from the light receiving area AR1 of the schematic configuration of the detector 4*d* shown in FIG. 1, while the output (dB+dD) from the adder 36 is associated with the output from the light receiving area AR2. The output (dB+dD) from the adder 36 is subtracted from the output (dA+dC) from the adder 35 by the subtracter 37 ((dA+dC)−(dB+dD)). Thus, the frequency characteristics of the output from the subtracter 37 are indicated by the curve ② of FIG. 1B.

The output from the subtracter 37 is supplied to a tR terminal of the switch 41. The state of the switch 41 is changed by the signal for differentiating the ROM zone from the rewritable zone of the disc 1. More specifically, during the reproduction of the embossed pit data, the switch 41 is connected to the tR terminal to supply the output from the subtracter 37 as the pit reproducing signal S3 to the subsequent stage, such as the clamp circuit 13, of the reproducing apparatus. The signal S3 is then to be decoded by the data decoder 15 according to the partial response PR (1, 0, −1) method. The frequency characteristics of the signal S3 are already comparable to those obtained by an appropriate equalizing operation, thereby making it unnecessary to perform an electrical equalizing operation before the signal S3 is decoded. The output from the subtracter 37 may be supplied as the servo pit signal S2 to the clamp circuit 9.

In contrast, the reflected light information from the magnetic pit is detected by the aid of the magnetic Kerr effect and is basically indicated by a difference signal between the output from the detector 4*d*1 and the output from the detector 4*d*2. To perform a more precise operation, in this example, a difference signal between the light receiving areas of the respective detectors 4*d*1 and 4*d*2 is further obtained. More specifically, the output from the light receiving area dC of the detector 4*d*2 is first subtracted from the output from the light receiving area dA of the detector 4*d*1 (dA−dC) by the subtracter 38. Moreover, the output from the light receiving area dD is subtracted from the output from the light receiving area dB (dB−dD) by the subtracter 39.

The output (dA−dC) from the subtracter 38 is comparable to the output from the light receiving area AR1 of the schematic configuration of the detector 4*d* shown in FIG. 1A, while the output (dB−dD) from the subtracter 39 is equal to the output from the light receiving area AR2. Then, a difference (dA−dC)−(dB−dD) between the output from the subtracter 38 and the output from the subtracter 39 is calculated by the subtracter 40. Thus, the frequency characteristics of the output from the subtracter 40 are indicated by the curve ② of FIG. 1B.

The output from the subtracter 40 is fed to a tM terminal of the switch 41. During the reproduction of the magnetic pit data of the disc 1, the switch 41 is connected to the tM terminal. Thus, the output from the subtracter 40 is supplied as the magnetic pit reproducing signal S3 to the subsequent stage, such as the clamp circuit 13, of the reproducing apparatus. The signal S3 is then to be decoded in the data decoder 15 in accordance with the partial response PR (1, 0, −1) method. The signal S3 already has frequency characteristics comparable to those obtained by a suitable equalizing operation, thereby making an electrical equalzing operation unnecessary before the signal S3 is decoded.

<9. Specific Example (ii) of the Circuits for Implementing the Second Embodiment>

Figure 9:
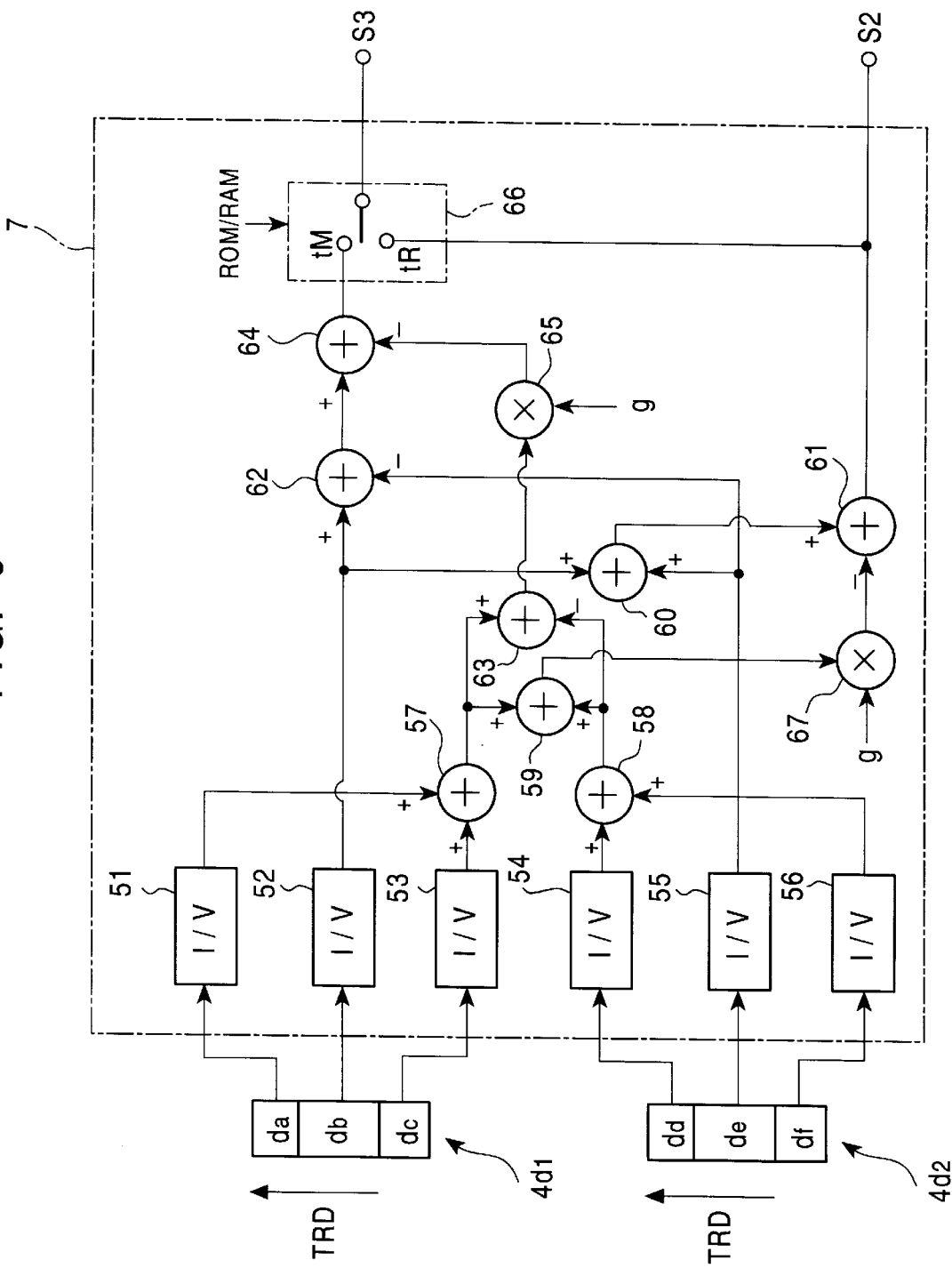
FIG. 9 is a block diagram of an I/V conversion matrix amplifier compatible with the example (i) of the optical system according to the second embodiment of the present invention.

When the optical system of the optical pickup 4 is configured as the example (ii) shown in FIG. 5, the I/V conversion matrix amplifier 7 may be configured as illustrated in FIG. 9. In this example, the detectors 4d1 and 4d2 of the optical system configured as shown in FIG. 5 are each divided, as shown in FIG. 2A, into three portions by lines perpendicular to the track directions TRD. As illustrated in FIG. 9, the light receiving areas of the detector 4d1 are indicated by da, db and dc, while the light receiving areas of the detector 4d2 are represented by dd, de and df.

An example of the configuration of the I/V conversion matrix amplifier 7 is shown in FIG. 9 (only the circuitry system relating to the processing of the signal S3 is shown). The matrix amplifier 7 generates the signal S3 for obtaining the reproducing data from the signals detected by the detectors 4d1 and 4d2. This circitry system is formed of I/V conversion circuits 51 through 56, adders 57 through 60, subtracters 61 through 64, multipliers 65 and 67, and a switch 66.

The current signals, photoelectrically converted by the light receiving areas da, db and dc of the detector 4d1 and the light receiving areas dd, de and df of the detector 4d2, are first converted into voltage signals by the I/V conversion circuits 51 through 56, respectively. Since the reflected light information from the embossed pit represents the amount of light, the information is normally indicated by the sum of the signals from the detectors 4d1 and 4d2. To perform a more precise operation, however, calculations are made on the respective outputs of the respective light receiving areas of the detectors 4d1 and 4d2.

More specifically, the output from the light receiving area db and the output from the light receiving area de are added (db+de) by the adder 60. Moreover, the outputs from the light receiving areas da and dc are added by the adder 57, while the outputs from the light receiving areas dd and df are added by the adder 58. The output from the adder 57 and the output from the adder 58 are then added by the adder 59, and the output from the adder 59 is further multiplied by the coefficient g in the multiplier 67. Finally, the output from the multiplier 67 is subtracted from the output from the adder 60 in the subtracter 61. The output from the subtracter 61 is used as the embossed-pit information signal S2 or S3.

The output (db+de) from the adder 60 corresponds to the output from the light receiving area AR2 of the schematic configuration illustrated in FIG. 2, while the output (da+dc)+(dd+df) from the adder 59 is associated with the sum of the outputs from the light receiving areas AR1 and AR3. The output from the adder 59 is multiplied by the coefficient g in the multiplier 67, and the output from the multiplier 67 is further subtracted from the output from the adder 60 in the subtacter 61 (db+de)−g{(da+dc)+(dd+df)}. Therefore, the output from the subtracter 61 is equal to $I\beta-g(I\alpha+I\gamma)$ representing the frequency characteristics indicated by the curve ③ of FIG. 2B.

The output from the subtracter 61 is supplied to a tR terminal of the switch 66. The state of the switch 66 is changed by the signal used for differentiating the ROM zone from the rewritable zone of the disc 1. During the reproduction of the embossed pit data, the switch 66 is connected to the tR terminal. Accordingly, the output from the subtracter 61 is fed as the pit reproducing signal S3 to the subsequent stage, such as the clamp circuit 13, of the reproducing apparatus. The signal S3 is then to be decoded by the data decoder 15 according to the partial response PR (1, 1) method. Since the signal S3 already has frequency characteristics comparable to those obtained by a suitable equalizing operation, an electrical equalizing operation can be omitted before the signal S3 is decoded.

On the other hand, the reflected light information from the magnetic pit is detected by the aid of the magnetic Kerr effect, and is represented by a difference signal between the detectors 4d1 and 4d2. In this example, however, calculations are further made on the respective outputs of the light receiving areas of the detectors 4d1 and 4d2.

More specifically, the output from the light receiving area de is subtracted from the output from the light receiving area db in the subtracter 62. Further, the difference between the outputs from the adders 57 and 58 is obtained by a subtracter 63, namely, the sum of the outputs from the light receiving areas dd and df is subtracted from the sum of the outputs from the light receiving areas da and dc ((da+dc)−(dd+df)).

The output (db−de) from the subtracter 62 is comparable to the output from the light receiving area AR2 of the schematic configuration of the detector 4d shown in FIG. 2A, while the output (da+dc)−(dd+df) from the subtracter 63 is equivalent to the sum of the outputs from the light receiving areas AR1 and AR3. The output from the subtracter 63 is multiplied by the coefficient g in the multiplier 65, and the output from the multiplier 65 is further subtracted from the output from the subtracter 62 in the subtracter 64 (db−de)−g{(da+dc)−(dd+df)}. Thus, the output from the subtracter 64 is equal to $I\beta-g(I\alpha+I\gamma)$ representing the frequency characteristics indicated by the curve ③ of FIG. 2B.

The output from the subtracter 64 is supplied to a tM terminal of the switch 66. During the reproduction of the magnetic pit data, the switch 66 is connected to the tM terminal. Thus, the output from the subtracter 64 is supplied as the magnetic pit reproducing signal S3 to the subsequent stage, such as the clamp circuit 13, of the reproducing apparatus. The signal S3 is then to be decoded by the data decoder 15 in accordance with the partial response PR (1, 1) method. Since the signal S3 already has frequency characteristics comparable to those obtained by an appropriate equalizing operation, an electrical equalizing operation by means of filtering is made unnecessary.

While the present invention has been explained with reference to the preferred embodiments, it is to be understood that the invention is not limited to the disclosed embodiments. On the contrary, the invention is intended to be changed and modified. For example, methods other than the partial response PR (1, 0, −1) and (1, 1) methods may be performed. In this case, calculations may be made on the outputs from a plurality of light receiving areas divided by lines perpendicular to track directions, thereby achieving a suitable equalizing operation in accordance with the spatial frequency characteristics. Moreover, the present invention may be used not only for performing an equalizing operation suitable for the partial response transmitting method, but also for correcting the frequency characteristics of a reflected-light information signal from a disc. Further, although the reproducing apparatus compatible with CAV-type discs are used in the foregoing embodiments, constant linear velocity (CLV)-disc-compatible reproducing apparatuses may be used for the present invention.

As is seen from the foregoing embodiments, the present invention offers the following advantages.

The detector of the optical pickup used in the present invention is divided into a plurality of light receiving areas by a line perpendicular to the track direction of a disc-like recording medium. Then, calculations are performed on the outputs from the respective light receiving areas in order to specifically correct the spatial frequency characteristics. The calculated signal is then decoded, thereby obtaining the reproducing data.

Namely, the above operation is performed to obtain the required frequency characteristics for the reproducing data signal. Also, by this operation, equalizing characteristics are naturally controlled in response to changes in the linear velocity (spatial frequency) caused by the different radial positions of the disc. This makes it possible to simplify the configuration of the circuitry of the partial response transmitting system. The simplicity of the partial response transmitting system (an electrical equalizing operation is unnecessary) is particularly advantageous for discs, such as zone CAV-type discs, of the type which is able to switch the clock frequency between the zones in performing a decoding operation.

Moreover, the detector is divided into a first light receiving area and a second light receiving area by a line perpendicular to the light receiving direction corresponding to the disc track direction. Then, a difference between the output from the first light receiving area and the output from the second light receiving area is calculated, thereby implementing an equalizing operation suitable for the partial response PR (1, 0, −1) method.

Further, the detector is divided into a first light receiving area, a second light receiving area, and a third light receiving area by lines perpendicular to the light receiving direction corresponding to the disc track direction. The output from the first light receiving area and the output from the third light receiving area are first added. The resulting output is then multiplied by a coefficient, and the multiplied output is subtracted from the output from the second light receiving area. It is thus possible to achieve an equalizing operation suitable for the partial response PR (1, 1) method. The coefficient used in the above multiplying operation is set so that the output level of the second light receiving area is equivalent to that of the sum of the output levels of the first and third light receiving areas. Then, the common-mode noise can be canceled.

What is claimed is:

1. An optical reproducing apparatus comprising:

laser emitting means for emitting laser light to an optical recording medium;

movement means for moving the laser light along a track of said optical recording medium;

light receiving means having a plurality of light receiving areas which are each divided by a line perpendicular to a direction of the track, each of said light receiving areas receiving the laser light reflected by said optical recording medium and outputting an electrical signal at a level in accordance with a quantity of the laser light;

calculation means for calculating the electrical signal from each of said plurality of light receiving areas based on a predetermined mathematical expression and outputting the calculated signal as a reproducing signal in which spatial frequency characteristics are corrected, wherein said predetermined mathematical expression approximates a frequency characteristic of a partial response method; and decoding means for decoding, without having performed an electrical equalizing operation, an information signal in accordance with a partial response method based on the reproducing signal output from said calculation means.

2. An optical reproducing apparatus according to claim 1, wherein said light receiving means is divided into a first light-receiving area, a second light-receiving area, and a third light-receiving area by lines perpendicular to the track direction.

3. An optical reproducing apparatus according to claim 2, wherein said calculation means calculates electrical signals output from said first, second and third light receiving areas based on an equation $$Io=Ib-g(Ia+Ic)$$

wherein Ia indicates a signal level of the electrical signal output from said first light-receiving area, Ib represents a signal level of the electrical signal output from said second light-receiving area, Ic designates a signal level of the electrical signal output from said third light-receiving area, Io indicates an output signal level of said calculation means, and g represents a constant.

4. An optical reproducing apparatus according to claim 3, wherein said decoding means decodes the information signal in accordance with a partial response PR (1, 1) method.

5. An optical reproducing apparatus according to claim 1, wherein said light receiving means is divided into a first light-receiving area and a second light-receiving area by the line perpendicular to the track direction.

6. An optical reproducing apparatus according to claim 5, wherein said calculation means calculates the electrical signals output from said first and second light receiving areas based on an equation $$Io=Ia-Ib$$

wherein Ia indicates a signal level of the electrical signal output from said first light-receiving area, Ib represents a signal level of the electrical signal output from said second light-receiving area, and Io indicates an output signal level of said calculation means.

7. An optical reproducing apparatus according to claim 6, wherein said decoding means decodes the information signal in accordance with a partial response PR (1, 0, −1) method.

8. An optical reproducing apparatus according to claim 1, wherein said optical recording medium comprises an optical disc.

9. An optical reproducing apparatus according to claim 8, wherein said optical disc comprises a zone CAV-type optical disc.

10. An optical reproducing apparatus, comprising:

an optical pickup configured to emit laser light to an optical recording medium;

a servo controller circuit configured to move the laser light along a track of said optical recording medium;

a laser detector having a plurality of light receiving areas which are each divided by a line perpendicular to a direction of the track, each of said light receiving areas configured to receive the laser light reflected by said optical recording medium and outputting an electrical signal at a level in accordance with a quantity of the laser light;

a current-to-voltage conversion matrix amplifier configured to calculate the electrical signal from each of said plurality of light receiving areas based on a predetermined mathematical expression and outputting the calculated signal as a reproducing signal in which spatial frequency characteristics are corrected, wherein said predetermined mathematical expression approximates a frequency characteristic of a partial response method; and a data decoder circuit configured to decode, without having performed an electrical equalizing operation, an information signal in accordance with said partial response method based on the reproducing signal output from said current-to-voltage conversion matrix amplifier.

11. An optical reproducing apparatus according to claim 10, wherein said laser detector is divided into a first light-receiving area, a second light-receiving area, and a third light-receiving area by lines perpendicular to the track direction.

12. An optical reproducing apparatus according to claim 11, wherein said current-to-voltage conversion matrix amplifier calculates electrical signals output from said first, second and third light receiving areas based on an equation $$Io=Ib-g(Ia+Ic)$$

wherein Ia indicates a signal level of the electrical signal output from said first light-receiving area, Ib represents a signal level of the electrical signal output from said second light-receiving area, Ic designates a signal level of the electrical signal output from said third light-receiving area, Io indicates an output signal level of said current-to-voltage conversion matrix amplifier, and g represents a constant.

13. An optical reproducing apparatus according to claim 12, wherein g is a value precalculated to reduce a common-mode noise quantity.

14. An optical reproducing apparatus according to claim 12, wherein said data decoder circuit decodes the information signal in accordance with a partial response PR (1, 1) method.

15. An optical reproducing apparatus according to claim 10, wherein said laser detector is divided into a first light-receiving area and a second light-receiving area by the line perpendicular to the track direction.

16. An optical reproducing apparatus according to claim 15, wherein said current-to-voltage conversion matrix amplifier calculates the electrical signals output from said first and second light receiving areas based on an equation $$Io=Ia-Ib$$

wherein Ia indicates a signal level of the electrical signal output from said first light-receiving area, Ib represents a signal level of the electrical signal output from said second light-receiving area, and Io indicates an output signal level of said current-to-voltage conversion matrix amplifier.

17. An optical reproducing apparatus according to claim 16, wherein said data decoder circuit decodes the information signal in accordance with a partial response PR (1, 0, −1) method.

18. An optical reproducing apparatus according to claim 10, wherein said optical recording medium comprises an optical disc.

19. An optical reproducing apparatus according to claim 18, wherein said optical disc comprises a zone CAV-type optical disc.

20. An optical reproducing apparatus according to claim 3, wherein g is a value precalculated to reduce a common-mode noise quantity.

* * * * *

UNITED STATES PATENT AND TRADEMARK OFFICE
CERTIFICATE OF CORRECTION

PATENT NO. : 6,198,711 B1　　　　　　　　　　　　　　　　　　　　Page 1 of 1
DATED : March 6, 2001
INVENTOR(S) : Goro Fujita et al.

It is certified that error appears in the above-identified patent and that said Letters Patent is hereby corrected as shown below:

Column 3,
Line 56, change "are" to -- is --.

Column 4,
Line 24, change "detrector" to -- detector --.

Column 6,
Line 12, change "4$b$" to -- 4$d$ --.

Column 8,
Line 24, change "P5" to -- Ps --.

Column 10,
Line 48, change "form" to -- from --.

Signed and Sealed this

Twenty-sixth Day of February, 2002

Attest:

Attesting Officer

JAMES E. ROGAN
Director of the United States Patent and Trademark Office